United States Patent [19]

Slade, deceased

[11] 4,133,097

[45] Jan. 9, 1979

[54] SYSTEM FOR ASSEMBLING FRAMED WALL SECTIONS

[75] Inventor: Edgar O. Slade, deceased, late of Moyock, N.C., by Eva Young Slade, administratrix

[73] Assignee: Advance Wall Systems, Inc., Langhorne, Pa.

[21] Appl. No.: 812,967

[22] Filed: Jul. 5, 1977

[51] Int. Cl.[2] .............................................. B23P 23/00

[52] U.S. Cl. .................................. 29/564.8; 29/33 P; 52/749; 227/101; 227/103; 156/559; 156/562; 144/3 E; 144/1 R; 144/309 N; 144/309 P; 144/318

[58] Field of Search ............. 144/3 R, 3 A, 3 B, 3 C, 144/3 E, 1 R, 309 R, 309 N, 309 P, 318; 227/44, 45, 100, 101, 103, 152; 156/559, 560, 562; 52/741, 745, 749; 29/33 K, 33 P, 432, 564, 564.1, 564.8, 795, 798, 822, 563

[56] References Cited

U.S. PATENT DOCUMENTS

| | | | |
|---|---|---|---|
| 3,537,168 | 11/1970 | Carroll | 29/564.8 |
| 3,538,967 | 11/1970 | Hensley | 144/326 |
| 3,592,376 | 7/1971 | Moehlenspan | 227/152 X |
| 3,688,965 | 9/1972 | Kellner et al. | 227/152 |
| 3,711,007 | 1/1973 | Fry | 227/101 |
| 3,765,587 | 10/1973 | Davis | 227/100 |
| 3,822,815 | 7/1974 | Davis | 227/100 |

*Primary Examiner*—Othell M. Simpson
*Assistant Examiner*—W. D. Bray
*Attorney, Agent, or Firm*—Caesar, Rivise, Bernstein & Cohen, Ltd.

[57] ABSTRACT

An integrated system for fabricating the wall section for a building. The wall section includes a framework composed of plural studs disposed in a parallel array between an opposed pair of plates and has sheathing secured over the framework. The system comprises a first workstation including a frame for supporting the studs and a frame for supporting the plates in abutment with the ends of the studs. Automatic nailing means are supported on a carriage which is movable along the frame and is operative to nail the abutting stud and plate portions together. Portions of the frame means are retractable to enable a conveyor to move the framework, once assembled, to a second workstation. The first workstation also includes cutting means mounted on a carriage for cutting off excess end portions from the opposed plates extending beyond the most upstream stud of the wall section. The second workstation includes a conveyor for receipt of the assembled framework. Pneumatic stapling means are located at the second workstation and mounted on a carriage for movement therealong. The stapler means is operative to secure sheathing over the framework. The second workstation also includes a second carriage movable therealong and carrying a saw and a router for movement across the workstation. The saw and router are adapted for cutting away portions of the sheathing to form openings in the wall section for doors, windows, etc.

18 Claims, 11 Drawing Figures

SYSTEM FOR ASSEMBLING FRAMED WALL SECTIONS

This invention relates generally to assembly systems and more particularly to a system for prefabricating building wall sections formed of a studded framework covered by sheathing material.

Framed buildings normally include wall sections which are formed of a framework over which sheathing is secured. The framework normally comprises a plurality of wooden studs disposed in a vertical parallel array between an opposed pair of plates (headers and sills). The plates are also in the form of wooden studs.

Up until recently it has been almost a universal practice to assemble framed wall sections element by element at the building site by arranging the studs and plates in an array, nailing them in place and then erecting the framework to form the wall. Once the framework of the building is completed conventinal sheathing, such as plywood, gypsum board, plastic foam panels, etc., are secured thereto to complete the wall structure.

More modern construction techniques elminate the element by element assembly process at the construction site by the use of prefabricated sub-assemblies, e.g., window sub-assemblies, door and door jam sub-assemblies, etc. However, even such techniques have been relatively limited due to the lack of viable systems for prefabricating wall sections.

In U.S. Pat. No. 3,399,445 there is disclosed apparatus for fabricating larger sub-assemblies of building structures, such as noble wall sections, in the interests of furthering the trend toward the prefabrication of major building components. To that end, the system disclosed comprises a conveyor structure having a plurality of workstations therealong. At the first workstation the elements forming the wall frame are provided to the conveyor by adjacently disposed mechanical loading and segregating means. Such means provides the elements forming the wall framework to the conveyor in the desired orientation. The loaded and segregated elements are then carried by the conveyor, to the second workstation at which the studs and header elements are nailed together by nailing units positioned at fixed locations with respect to the workstation. The partially assembled elements of the framework are then carried to the third workstation where windows and corner braces are provided to the partially assembled frame. The windows and corner braces are nailed in place and then the wall framework is carried to the fourth workstation by the conveyor means. At the fourth workstation strips of exterior siding are applied and nailed in place, with the nail holes being caulked. A vapor barrier is drawn from a roll across the framework at the fourth workstation. The wall frame leaves the fourth workstation and is carried to the fifth workstation where it is coated with a suitable material or a finish covering.

While the system of U.S. Pat. No. 3,399,445 offers a means to an end of providing larger prefabricated structural components, it still leaves much to be desired from the standpoint of wide utility. In this regard, the system is quite complex, thereby minimizing its utility for small builders. Furthermore, and perhaps more importantly, since the system is particularly suited for the rapid assembly of identical wall units it has limited utility for the fabrication of individual wall sections, such as would normally be required by smaller builders or builders of custom buildings, wherein individual wall sections to be fabricated differ from one another.

Accordingly, it is a general object of the instant invention to provide a wall fabrication system which overcomes the disadvantages of the prior art.

It is a further object of the instant invention to provide a wall fabrication system which enables the fabrication of various sized and shaped wall sections.

It is still a further object of the instant invention to provide a wall fabrication system which is relatively simple and adapted to form a wide variety of wall sections.

These and other objects of the instant invention are achieved by providing a system for forming a wall section for a building, with the wall being composed of a framework of plural studs disposed in a parallel array between a pair of opposed plates and sheathing disposed over the framework. The system comprises a first workstation for assembling the studs and plates into the framework and a second workstation for securing the sheathing to the assembled framework. First conveyor means are provided at the first workstation for carrying the assembled framework from the first workstation to the second workstation. The first workstation comprises first means for locating the studs thereon in a parallel array and second means for locating each of the plates perpendicular to the studs and in contact with the ends of the studs. Automatically operating assemble means is located at the first workstation and is operative to assemble the studs and plates into a utilized framework. The means comprises a carriage supporting nailing units thereon and mounted for movement along the plates. The carriage moves along the plates and is automatically operative at the location of each of the studs to nail the end of the stud to the abutting portion of the opposed plate. The first and second positioning means are retractable to enable the conveyor means to carry assembled framework to the second workstation. The second workstation comprises assembling means mounted on a carriage and adapted to move along each of the studs to secure the sheathing to the framework. The carriage is movable along the second workstation. Another carriage is provided at the second workstation for mounting cutting means thereon. The cutting means are adapted to remove portions of the sheathing to form windows, doorways, arches, etc.

Other objects and many of the attendant advantages of the instant invention will become readily apparent by reference to the accompanying drawings wherein.

Figure 1A:
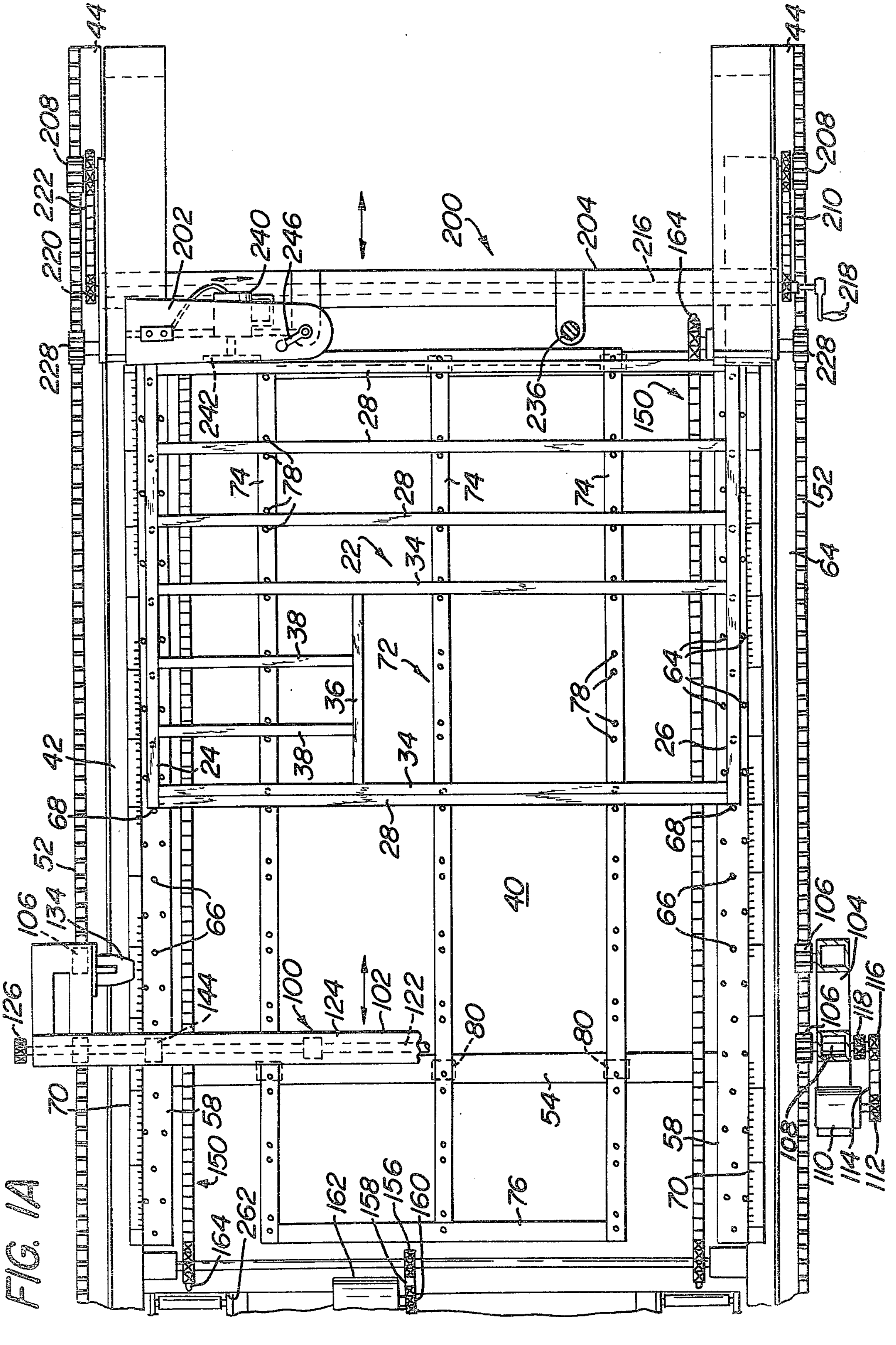
FIG. 1A is a plan view, partially in section, of the first workstation portion of the system in accordance with the instant invention.
Figure 1B:
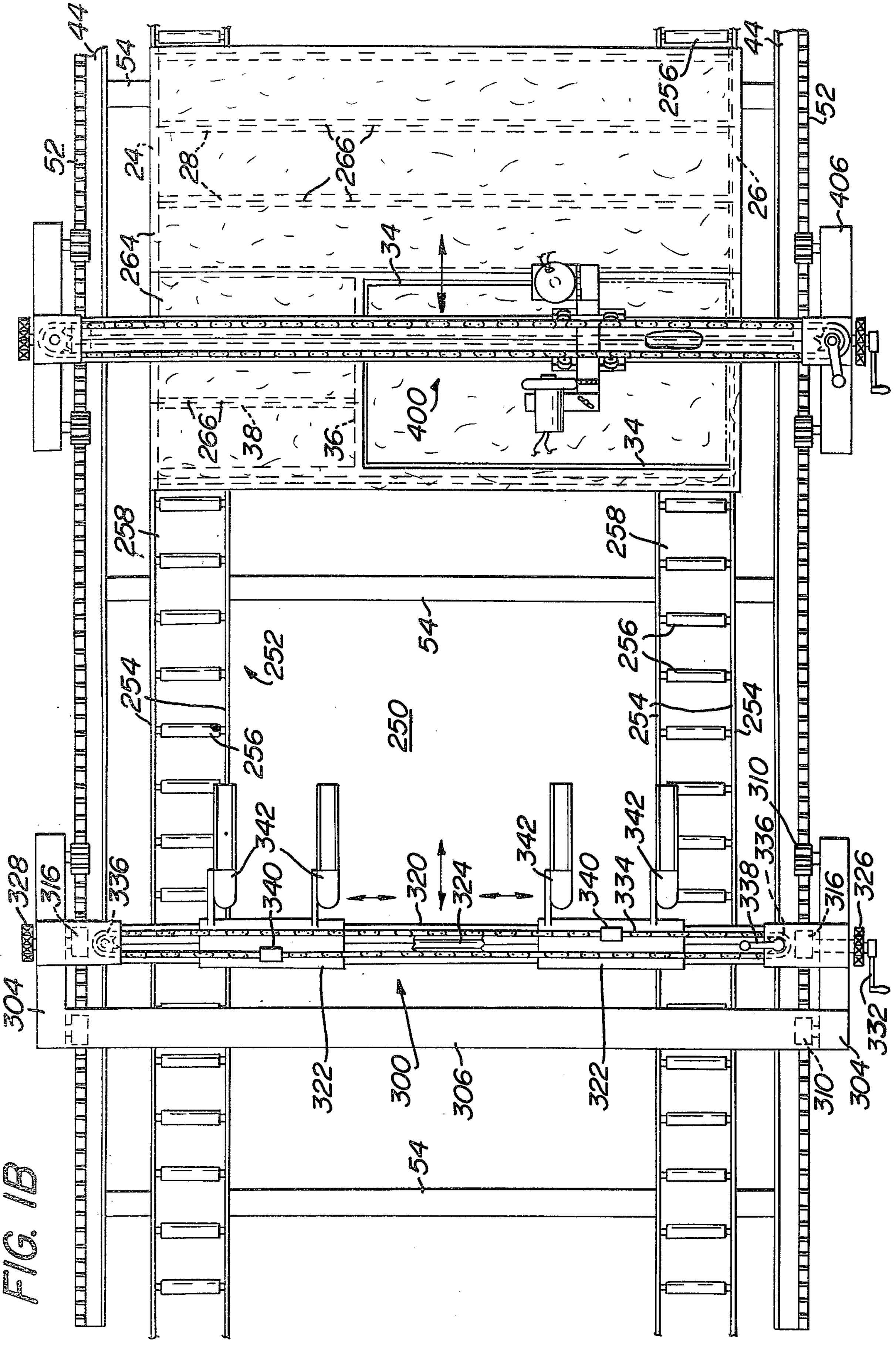
FIG. 1B is a plan view, partially in section, of a downstream portion of the system which forms a second workstation.
Figure 3:
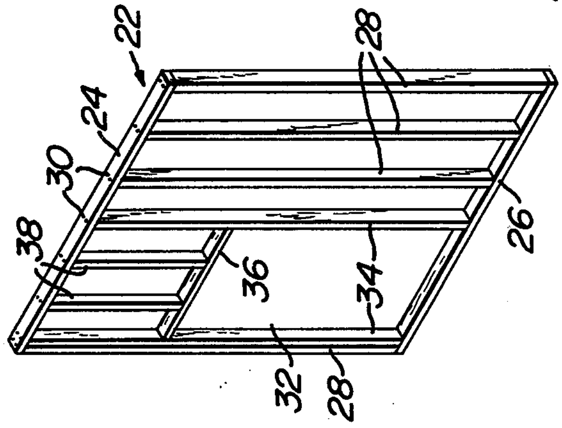
FIG. 3 is a perspective view of a typical wall framework constructed by the system of the instant invention.

Referring now in greater detail to the various figures of the drawing wherein like reference characters refer to like parts, there is shown generally at 20 in FIGS. 1A and 1B a system for assembling a framed wall section for a building. The framed wall section comprises a framework of wooden elements which are interconnected together in an array and over which sheathing material is secured. In FIG. 3 there is shown a typical wooden framework for a wall section assembled by the instant invention. As can be seen, the framework 22 comprises a top plate or header member 24, a bottom plate or still member 26 and a plurality of studs 28 extending therebetween. The studs are disposed parallel to one another, and as a conventional practice are spaced on sixteen inch centers. The header plate 24 is nailed at 30 to the top end of each of the studs 28, while the bottom plated is nailed to the lower ends of the studs.

In the wall section embodiment shown in FIG. 3 the wall frame 22 includes a doorway 32. The doorway is formed as a sub-assembly and includes a pair of side stud members 34, a cross piece 36 extending between the studs 34 and secured thereto by nails and a pair of short vertically extending studs 38 which are nailed to the cross piece 36.

It should be pointed out at this juncture that system 20 is not suitable for fabricating the door sub-assembly 32 or any other type of sub-assembly, such as a window sub-assembly, etc., which includes less than full length studs. Instead such sub-assemblies are fabricated at another location and when required in a wall framework 22 the sub-assembly is brought as a unit to the first workstation for assembly with the other elements making up the wall section.

The upstream or first workstation of the system 20 is shown in FIG. 1B, designated by the reference numeral 40, and is the location at which the components making up the wall section framework 22 are assembled.

Figure 6:
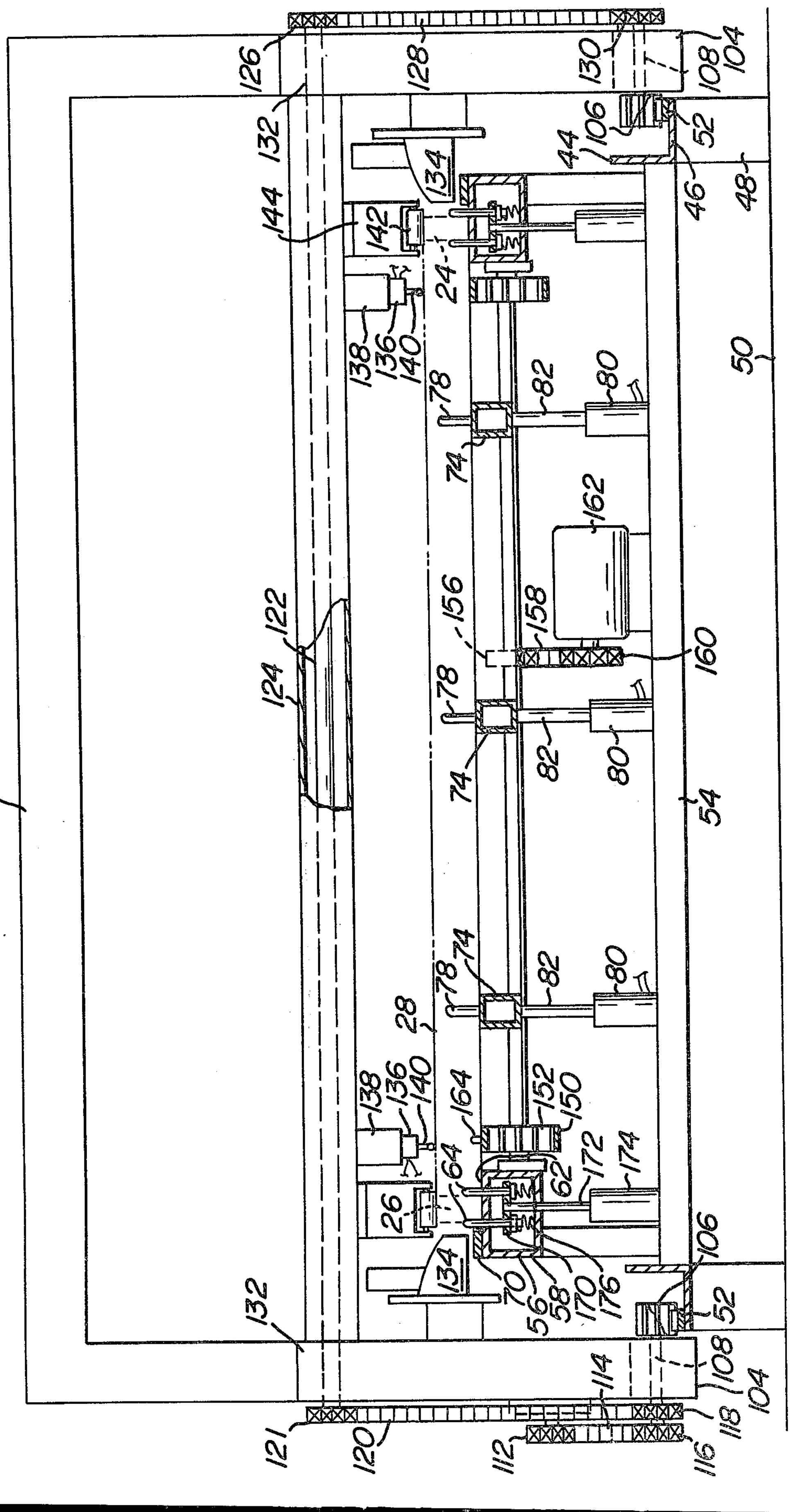
FIG. 6 is an enlarged sectional view taken along line 6—6 of FIG. 2A.

The system 20 comprises a common support frame 42 in the form of a pair of side rails extending the entire length of system 20. As can be seen in FIG. 6, the side rails 44 are each of angle stock material including a base portion 46. Secured to the underside of the base portion at spaced locations along the length of the rails 44 are downwardly projecting legs 48. The legs support the system above the ground 50. On the upper surface of the base portion 46 of the rails there is provided a toothed rack extending the full length of the rails. The rack is denoted by the reference numeral 52. A pair of cross supports 54 are connected between the vertically projecting portions of the rails 44. The cross supports 54 serve to support and hold a fixed frame 56 at the first workstation.

The fixed frame 56, as will be described in detail later, is arranged to support and hold the header plate 24 and sill plate 26 with respect to the parallel studs 28 during the assembly operation. To that end, fixed frame 56 comprises a pair of hollow members 58 extending the full length of the first workstation 40. The members 58 are supported on the cross supports 54, via plural upstanding legs 60, as shown in FIG. 6. As can be seen therein, the longitudinally extending frame members 58 include a top supporting surface 62 upon which the header and sill plate elements are arranged to be disposed. A plurality of pairs of locator pins 64 project upward from the top surface 62 of the fixed frame 56. Each pair of locator pins 64 defines a space therebetween which is adapted to receive the elements, e.g., 2 inches × 4 inches wooden stud, forming the header plate or base plate.

At intermediate locations in the fixed frame portion 56 between the spaced pairs of locating pins a series of openings 66 are provided. The openings are equidistantly spaced along the frame at one foot centers. Each opening is arranged to receive a pin 68. The insertion of a pin 68 within one of the openings 66 establies the longitudinal position of either the header plate 24 or base plate 26 at the first workstation 40 and hence establies the length of the wall section 22 to be assembled. In order to facilitate the measurement of a length of a wall section being fabricated at the workstation 40 each of the fixed frame portions 56 includes indicia bearing strips 70 secured to the top surface 62 thereof.

The location of each of the studs 28 of the framework is established by a movable frame assembly 72. To that end, the movable frame includes three longitudinally extending portions 74 and a pair of opposed end portions 76. The top surface of the portions 74 form a support for the studs 28, and for the doorway side studs 34 and short studs 38. The desired spacing between the studs is established by plural pairs of locating pins 78 which project upward from the top surface of each portion 74. The pins of each pair are separated from each other by a sufficient distance for receipt of a stud therebetween. The spacing between sequential pairs of locator pins 78 along each frame portion 74 is preferably sixteen inches so that when the studs are disposed between the locating pins, as shown in FIG. 1B, the studs 28 are on sixteen inch centers (which is conventional for typical building construction).

The movable frame 72 is supported on the cross supports 54, via a plurality of pneumatic cylinders 80. Each cylinder 80 is mounted on the cross supports 54 and includes an upwardly project rod 82. The free end of the rod 82 is secured (e.g., welded) to the underside of the longitudinal members 74 of movable frame 72.

The pistons 80 are operative to raise the frame 72 to an extended position, shown in FIG. 6, wherein the top surface of the members 74 of the frame 72 is co-planar with the top surface 62 of the of the fixed frame 56.

The loading of the elements forming the framework 22 at workstation 40 is accomplished in the following manner: the movable frame is raised to the extended or flush position shown in FIG. 6 by the actuation of the pneumatic cylinders 80. The stud-like element forming the top plate 24 of the framework 22 is placed on a hollow portion 58 of the fixed frame 56 between its opposed pairs of locating pins 64. Depending upon the length of the wall section 22 to be assembled a locating or stop pin 68 is inserted in a preselected central hole 66. The element forming the top plate member 24 is moved on the hollow portion 58 of the fixed frame until its end abuts the stop pin 68. As can be seen, each of the holes 66 in the fixed frame portions 58 are transversely aligned with the downstream most pin of the aligned pairs of locating pins 78 on the movable frame 72. This feature ensures that the downstream most stud 28 in the wall section is flush with the ends of the top plate 24 and sill plate 26. The sill plate 26 is located on the other fixed frame portion 58 in the same manner as the top plate 24.

The studs 28 forming the wall framework are then inserted between the transversely aligned pairs of locating pins 78 so as to extend between the top plate 24 and sill plate 26. The preassembled door sub-assembly, composed of side studs 34, the cross piece 36 and the short studs 38 is then inserted at the appropriate location within the wall section framework such that the stud portions lie between transversely aligned pairs of locating pins 78. As can be seen from the plan view of FIG. 1A, the left most studs 34 of the door sub-assembly abuts the downstream most stud 28 of the wall to provide a double thick end stud in accordance with conventional building practice.

In order for the movable frame to accommodate wall section frameworks including double thick studs (e.g., portions having two parallel abutting studs) the locator pins 78 are depressable into the hollow interior of the leg portions 74 of the frame 72. The pins are spring biased to normally project upward. When a stud is disposed immediately over a line of pin 78 as occurs when there is a double thick stud portion, the weight of the stud depresses the underlying pins into the interior of the frame portion 74 so that the pins do not interfere with the layout of the studs forming the framework 22.

Once all of the elements making up the framework 22 are disposed on the fixed and movable frame of workstation 40 the framework is ready for assembly or securement.

In accordance with a preferred aspect of the invention the means for effecting the securement of the opposed plates 24 and 26 to the transversely extending studs 28 and 34 comprises an automatically operating nailing assembly 100. The assembly 100 is in the form of a carriage 102 adapted to be moved longitudinally up and down the workstation and carrying a pair of nailing devices, to be described later, on each side of the workstation. To that end, the carriage 102 is in the form of a generally U-shaped support having a pair of side legs each terminating in a horizontal base portion 104 (FIG. 6). A pair of pinion gears 106 (FIG. 2B) are mounted on a shaft 108 extending through each of the portions 104. The pinion gears of each portion 104 are adapted to interengage and roll along the toothed rack 52.

Figure 2A:
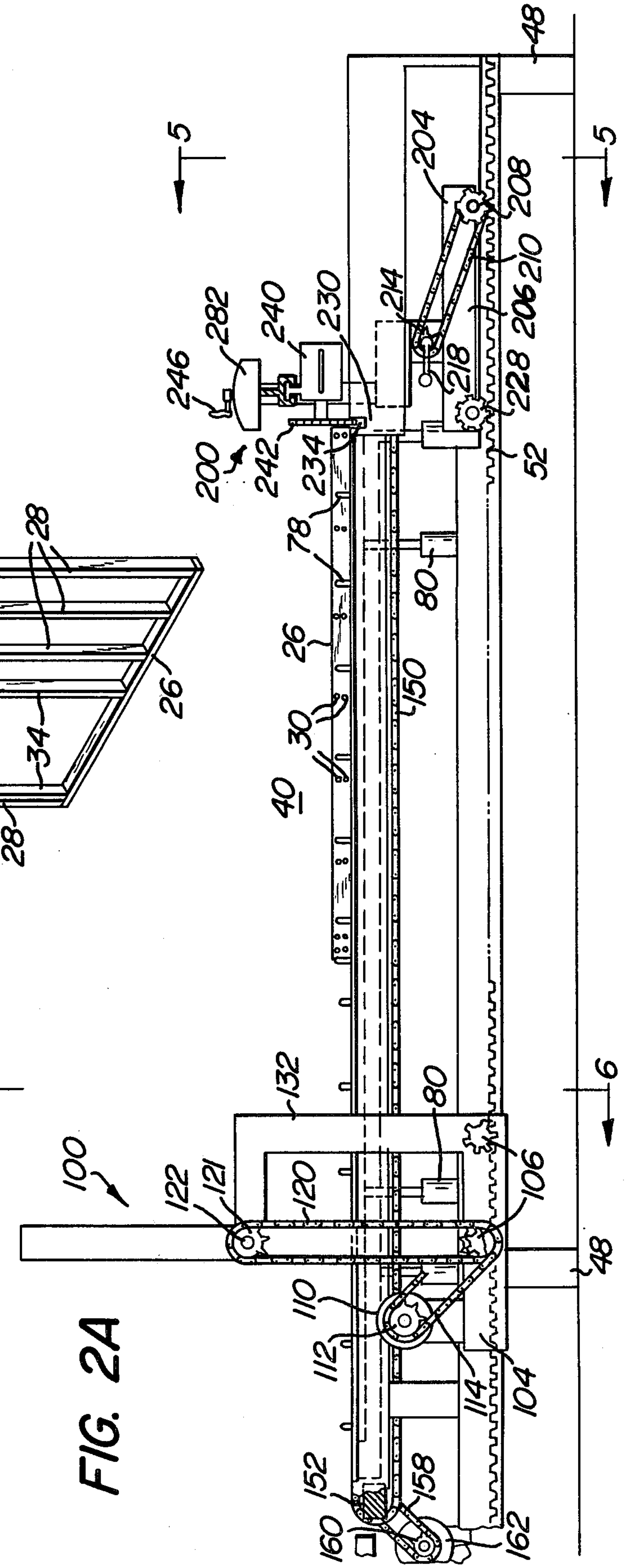
FIG. 2A is a side elevational view, partially in section, of the portion of the system shown in FIG. 1A.
Figure 2B:
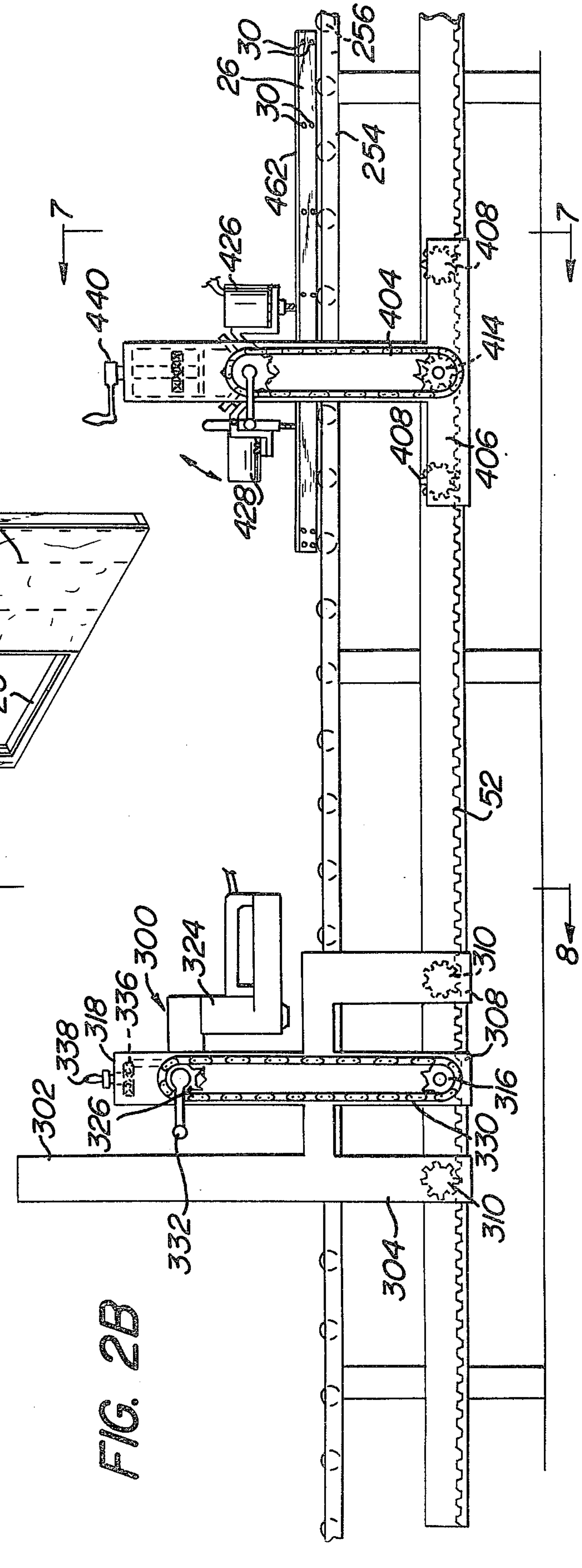
FIG. 2B is a side elevational view of the portion of the system shown in FIG. 1B.

In order to drive the carriage 102 up and down the rack 52 an electric motor 110 is mounted on an upstanding support 113 of the carriage frame (FIG. 2B). The output shaft of the motor is connected to a sprocket 112. A drive chain 114 encircles the sprocket 112 and another sprocket 116 which, as can be seen in FIG. 6, is connected to a shaft 108. A second sprocket 118 is mounted on the shaft 108 and immediately adjacent to sprocket 116. A chain 120 is disposed about the sprocket 118 and another sprocket 121 which is mounted on one end of a cross shaft 122. The shaft 122 extends through the hollow interior of a cross frame portion 124 mounted between the side legs of the carriage. The other end of the shaft 122 has a sprocket 126 mounted thereon. A chain 128 is disposed about sprocket 126 and also about a sprocket 130 which is mounted on the free end of another shaft 108 connected to pinion gear 106 on the opposite side of the carriage from the motor 110.

As will be appreciated, the rotation of the electric motor 110 causes the circulation of drive chain 114 and the concomitant rotation of a sprocket 116 and the shaft 108 coupled thereto. The rotation of shaft 108 in turn causes the pinion gear 106 to roll along the rack 52. At the same time the rotation of sprocket 116 also causes the rotation of sprocket 118. The latter rotation is coupled through cross shaft 122 and the sprockets 126 and 130 and chain 128 to the pinion gear 106 on the other side of the frame from the motor. Accordingly, a synchronous drive for the carriage 102 is provided by the single motor 110 to move the carriage up or down the workstation, depending upon the direction of rotation of the motor.

Each of the side legs of the frame includes an offset portion 132 (FIGS. 2B and 6) upon which is mounted a nailing device 134. The devices are at a predetermined height so that they are aligned with the ends of the studs 28 to be nailed to the opposed plates 24 and 26. Each of the nailing devices is a pneumatic unit and of conventional construction. Examples of prior art pneumatic nailers are shown in U.S. Pat. Nos. 2,729,198, 3,099,837, 3,170,487, 3,494,530, 3,536,438 and 3,945,551.

In accordance with a preferred aspect of this invention each of the nailers is controlled so as to drive nails into the framework automatically when it is aligned with the end of a stud. To that end, as can be seen in FIG. 6, a pair of microswitches 138 are mounted on respective brackets 140 extending from the cross frame 124 and closely adjacent to each side of the workbed. Each microswitch is aligned transversely with its associated nailer and is connected to means (not shown) for actuating the associated nailers 134 when the actuating arm 140 of the microswitch is tripped. The arm 140 extends downward to a height slightly lower than the top edge of the studs forming the framework.

As should thus be appreciated by those skilled in the art, as the carriage 102 moves down the workstation each time that a microswitch arm 140 contacts a stud 28, the arm is raised, thereby tripping the microswitch and actuating the associated nailers 134. This action ensures that each of the studs ends is nailed to its associated plate automatically. In order to ensure that double studs are nailed to the abutting plates each of the microswitches has a second similar microswitch mounted on the frame portion 124 immediately downstream. The second microswitches (not shown) are each also connected to the means (not shown) for actuating the associated nailers when the second microswitch actuating arm is tripped if the actuating arm of the first microswitch is still tripped (as would be the case with a double width stud but not with a single width stud).

In order to hold the framework 22 in place during the nailing operation the cross frame 124 includes a pair of hold down rollers mounted on suitable brackets 144 and projecting downward. The rollers are spaced apart by the spacing between the top plate and the sill plate of a conventional wall section so that each roller rolls along its associated plate to hold the plate in position during the nailing operation.

Once the nailing operation has been accomplished the assembled framework 22 can be carried by a conveyor means, to be described later, downstream to the second workstation where suitable covering or sheathing is applied and then openings cut out of the sheathing to form windows, doors, etc., as desired.

The conveyor means of the first workstation comprises a pair of chains 150. Each chain is formed in a loop and extends horizontally for substantially the full length of the first workstation. One chain is disposed on one side of the workbed and the other chain on the other side of the workbed. Each chain loops about a pair of spaced sprockets 152 (only one of which can be seen). The sprockets are mounted on the inside surface of each of the fixed frame portions 58 (see FIG. 6). One sprocket 152 associated with one chain and the corresponding sprocket 152 associated with the other chain are connected together, via a common rotatable cross shaft 154. Another drive sprocket 156 is mounted in the middle of the shaft 154. A drive chain 158 extends about sprocket 156 and over another drive sprocket 160 connected to the output shaft of an electric motor 162. Accordingly, the rotation of motor 162 causes the circulation of conveyor chains 150 over their associated support sprockets 152.

Each of the chain conveyors 150 includes at least two projecting fingers 164. The fingers are adapted to make contact with the upstream most stud 28 of the wall section 22 when the chain conveyor is circulated in the clockwise direction shown in FIG. 2B. Accordingly, the fingers 164 serve to push the assembled framework down the conveyor toward the second workstation when the conveyor is operated by motor 162.

In order to preclude the locating pins 78 and the locating pins 64 from impeding the movement of the assembled framework 22 down the conveyor, both types of locating pins are retractable. In the case of locating pins 78, the retraction of such pins is effected by the lowering of the entire movable frame 72 from the position shown in FIG. 6. In the case of the locating pins 64, fixed frame portion 58 remains in place but the locating pins 64 are retracted within. To that end, as can be seen in FIG. 6, each of the pins 64 of one frame portion 58 is mounted on a common plate 170 extending for approximately the full length within the hollow interior portion of the frame. Each plate 170 is connected to a shaft 172 of a pneumatic cylinder 174. Each cylinder 174 is mounted on the cross portion 54. Each of the pins 64 includes a biasing spring 176 connected between it and the interior of the hollow frame member 58 under the plate 170.

The cylinder 174 is operative to pull the shaft 172 toward it thereby retracting plate 170 downward from the position shown in FIG. 6. The retraction of plate 170 effects the concomitant retraction of pins 64 within the interior of the hollow portion 58 of the fixed frame.

In accordance with one aspect of this invention, means are provided at the first workstation for sawing off any excess length portions from the upstream ends of the header plate and the sill plate. By excess portions it is meant that those lengths of the header plate and sill plate elements which extend beyond the upstream most stud 28 and which portions are not wanted as part of the wall framework 22. The assembly for sawing the excess portions is arranged for operation at the point in the workstation immediately adjacent to the location of the upstream most stud 28 and is denoted generally by the reference numeral 200.

As will be described in detail later, the sawing assembly 200 is mounted for longitudinal movement at the workstation to enable it to be retracted out of the way (i.e., upstream) during the nailing operation so as not to impede the movement of the nailing assembly 100 to the position for nailing the upstream most stud.

Figure 5:
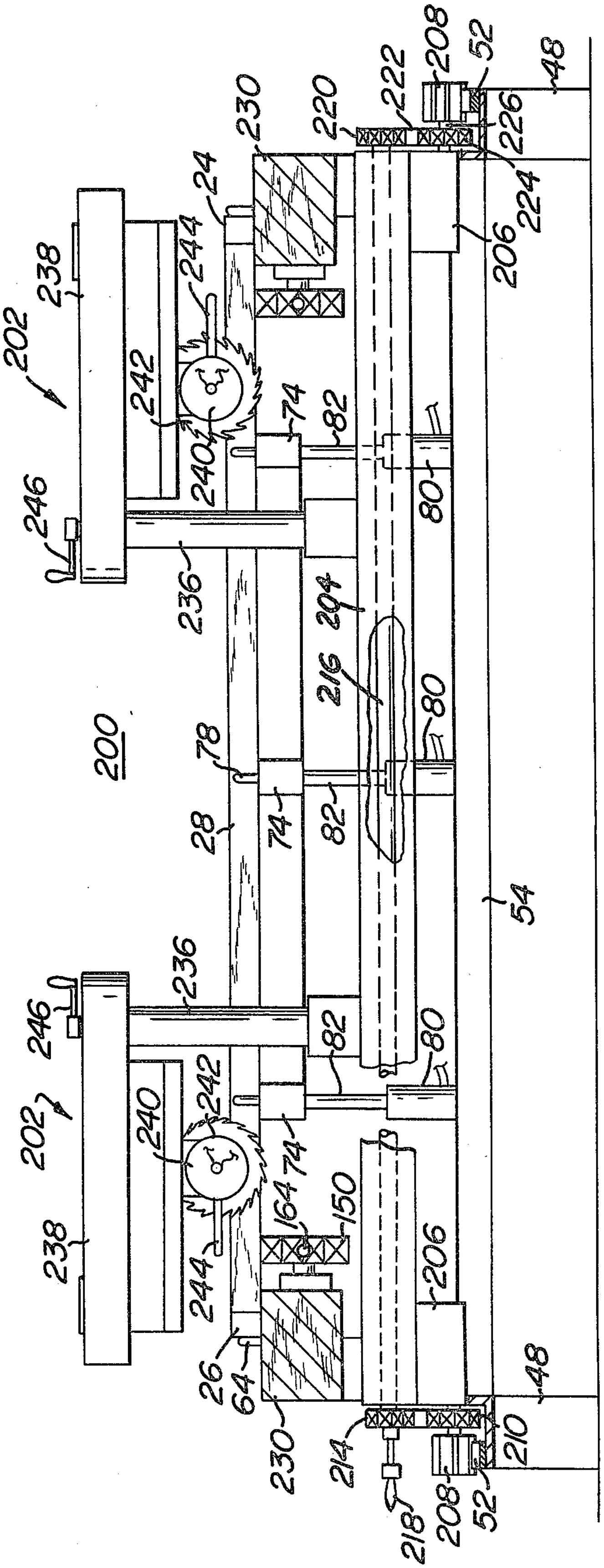
FIG. 5 is an enlarged sectional view taken along line 5—5 of FIG. 2A.

The cutting assembly 200 is shown clearly in FIGS. 1A, 2A and 5. As can be seen therein, assembly 200 basically comprises a pair of radial arm saws 202 mounted on a common carriage 204, with each radial arm saw being disposed adjacent to an associated side of the workbed. The carriage frame 204 includes a pair of legs 206 is a pinion gear 208 which is adapted to roll along rack 52. The pinion gear 208 is driven, via a sprocket 210, mounted on a shaft. A drive chain 212 is disposed around the sprocket 210 and about another sprocket 214. The sprocket 214 is on one end of a common drive shaft 216 (FIG. 5). A hand crank is connected to one end of the cross shaft 216. The other end of the cross shaft 216 has mounted thereon a sprocket 220. Extending over sprocket 220 is a chain 222 which extends about another sprocket 224. Sprocket 224 is mounted on a shaft 226 extending into the leg 206 of the carriage 204. Also mounted on shaft 226 is another pinion gear 208 which is operative to roll along its associated rack 52. Each of the legs 206 of the frame also includes another pinion gear 228 (see FIG. 2A) cooperating with its associated rack 52.

As will be appreciated by those skilled in the art, the manual rotation of crank 218 effects the rotation of both of the pinion gears 208, one directly through the associated sprockets and chains and the other through the cross drive shaft and the associated sprockets and chains to move the carriage up or down the workstation, depending upon the direction of rotation of the crank.

The crank 218 is rotated clockwise to move the assembly 200 upstream (to the right in FIG. 2A) so as to provide a free path for movement of the nailing apparatus 100. Once the framework 22 has been nailed by the apparatus 100, said apparatus is moved downstream and then crank 218 of the cutting means 200 is rotated counter-clockwise to move the carriage, and the radial arm saws 202 carried thereby to the position immediately adjacent to the end most or upstream most stud of the framework. A wooden cutting block or guide 230 is mounted on the carriage 204 at each side thereof. Each block 230 includes a guide notch 234 for receiving the blade of the associated radial arm saw 202.

As seen clearly in FIG. 5, each radial arm saw 202 includes an upwardly projecting support shaft 236 from which an overhanging arm 238 projects outward and parallel to the studs 28 forming the framework 22. Mounted on each arm 238 is an electrically operated saw 240 having a circular blade 242 mounted thereon. Each saw is arranged to be moved along the arm 238 under manual control, via a handle 244.

The blocks 230 are preferably formed of wood to ensure that if the saw blade 242 becomes bent and would hit the side wall of the notch no damage or hazardous condition will arise.

As is conventional each of the radial arm saws includes a crank 246 for adjusting the height of the arm 238 with respect to the work piece.

Operation of the cutting means 200 is as follows: after the frame has been assembled and nailed the assembly 200 is then moved to the operative position immediately adjacent the upstream most stud 28, via the rotation of crank 218, as described heretofore. The operator then adjusts the positioning of the height of the radial arm saw for cutting the sill plate 26 and adjusts the height of the other radial arm saw for cutting the head plate 24. Each saw is turned on and pulled outward along its arm 238 by the operator grasping handle 244. The rotating saw blade passes through the overhanging plate portion to sever said portion from the remainder of the plate.

Once the excess plate portions of the framework 22 have been sawed off by the assembly 200, as described heretofore, the pneumatic cylinders 80 and 174 are operated to retract the locating pins 78, via the lowering of movable frame 72, and to retract the locating pins 64, via the lowering of plate 170 within the fixed frame portions 58. Each stop pin 68 is manually removed from its associated hole 66. The completed framework 22 is then free to be moved down the conveyor 150 in the downstream direction to the second workstation.

The second workstation, denoted by the reference numeral 250 is downstream of the first workstation and includes a continuation of the elongated side rails 44 and the associated racks 52 extending therealong. The side rails 44 at the second workstation are also supported above the ground 50 by legs 48. Plural cross supports 54 extend between the side rails 44 at the second workstation in the same manner as described heretofore.

The second workstation also includes a second conveyor, denoted generally by the reference numeral 252. The conveyor 252 is formed of a pair of identical elements. To that end, each element comprises a pair of opposed longitudinally extending side members 254, between which there are journalled a plurality of cylindrical rollers 256. A longitudinally extending bottom plate 258 extends the full length of each of the elements. The bottom plate 258 is connected between the side elements 254 and serves as the means for supporting each of the elements of the conveyor. To that end, plural upstanding legs 260 are welded to the cross supports 54 and are also welded to the bottom surface of the plates 258. The legs 260 are of a suitable length so that the plane of the surface of the cylindrical rollers 256 is substantially co-planar with the plane of the surface of the conveyor chains 150 at the first workstation. As can be seen in FIG. 1A, the upstream end of the second conveyor 252, denoted by the reference numeral 262 is disposed immediately adjacent to the downstream end of conveyor chains 150. Accordingly, as the completed framework 22 is moved down the first conveyor it enters the second conveyor. The rollers 256 of the second conveyor are freely journalled so that the assembled framework 22 can freely slide therealong.

At the second workstation 250 sheathing material, such as conventional gypsum board, plywood, panelling, styrofoam, etc., is laid onto the assembled framework 22. Depending upon the size of the framework the sheathing may be in the form of a single sheet or plural sheets. For the wall section shown in the drawings the sheating is commonly in the form of two panels.

Figure 4:
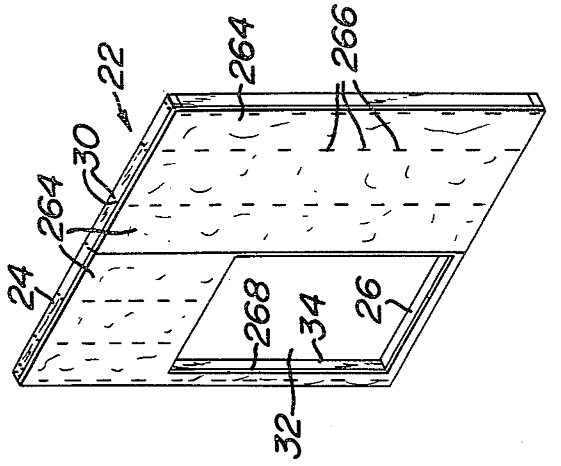
FIG. 4 is a perspective view of a completed wall section using the framework shown in FIG. 3.

In FIG. 4 there is shown a completed wall section formed by the system of the instant invention. As can be seen therein, the wall section comprises the framework 22 and a pair of sheathing panels 264. The panels are secured to the framework, by staples 266. The stapling operation is accomplished at the second workstation 250. Also, the second workstation includes means for cutting an opening 268 into one of the panels 264 coincident with the door opening 32 in the framework 22.

Figure 8:
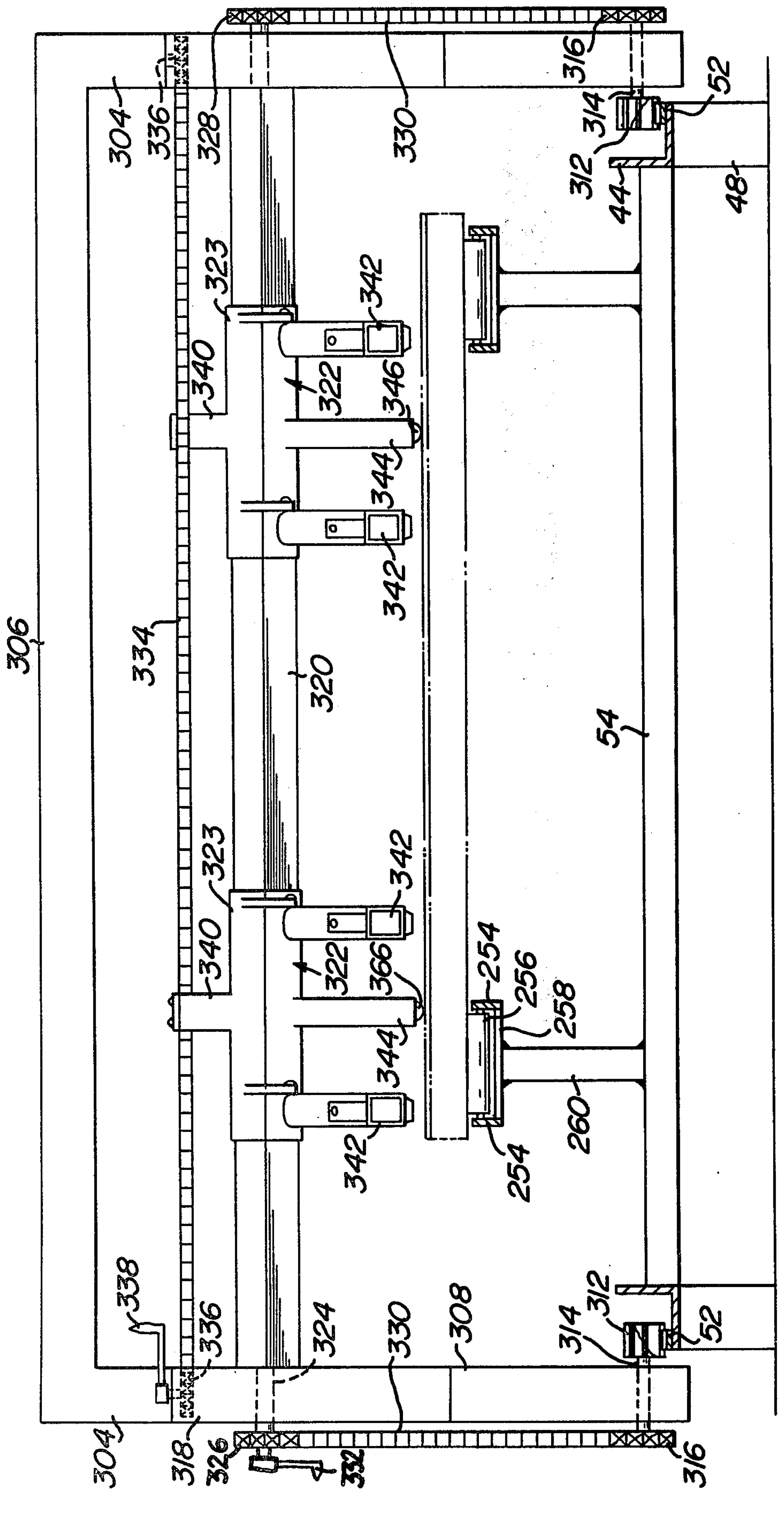
FIG. 8 is an enlarged sectional view taken along line 8—8 of FIG. 2B.

The apparatus for stapling the panels 264 to the framework 22 is denoted generally by the reference numeral 300 and basically comprises a carriage in the form of a generally U-shaped frame 302 having a pair of side legs 304 and a bridging portion 306 (FIG. 8). Connected to each of the downwardly extending legs 304 is another pair of downwardly extending legs 308 (FIG. 2B). A pinion gear 310 is mounted for rotation at the free end of leg 304 and at the free end of the upstream most leg 308. Mounted at the free end of the intermediate leg 308 there is a pinion gear 312 (FIG. 8). Pinion gears 310 and 312 all are arranged to roll along rack 52 in a manner as described heretofore. The pinion gear 312 is mounted on a rotatable drive shaft 314, the free end of which terminates in a sprocket 316.

The middle leg 308 on each side of the frame 302 includes an upward extension 318. A cross beam 320 is connected between the opposed upward extensions 318. The beam 320 serves as a guide rail for supporting and guiding the movement of plural stapling assemblies 322. As will be described in detail later, the assemblies 322 are arranged to be moved in unison toward and away from each other under manual control.

As can be seen in FIG. 8, a cross drive shaft 324 extends through the top portion of extension 318, through the hollow interior of cross beam 320 and through the top portion of the opposed extension 318. A sprocket 326 is mounted on one end of the cross shaft 324 and a similar sprocket 328 is mounted on the other end of the shaft. A drive chain 330 extends about sprockets 316 and 326. A crank 332 is connected to the cross shaft 324 immediately adjacent to sprocket 326.

As should be appreciated from the foregoing, the rotation of crank 332 causes the rotation of the pinions 312, via the associated sprockets and drive chains to thereby move the stapling apparatus 300 up or down the rack 52, depending upon the direction of rotation of crank 332. Accordingly, the longitudinal positioning of the stapling assemblies 322 with respect to the work piece (the framework having the sheathing thereon) can be set as desired.

As noted heretofore, the stapling assemblies are arranged to be moved in unison either toward or away from each other to effect the complete traversal of the height of the wall section being fabricated. To that end, each of the stapling assemblies 322 comprises a hollow carrier 323 of generally rectangular cross-section and surrounding the cross beam 320. The carriers 323 are freely slideable along the cross beam. The means for moving the carriers comprises a drive chain 334. The drive chain 334 extends about a spaced pair of sprockets 336. One sprocket 336 is mounted horizontally within the upper portion of one extension 318 and the other sprocket 336 is mounted in a similar manner within the upper portion of the other extension 318. As can be seen, a crank 338 is connected to the sprocket located in the extension 318 from which crank 332 extends. The carriers 323 are each connected to the drive chain 334, via upwardly projecting brackets 340 (FIG. 1B). Each bracket is mounted on an opposed side of the drive chain so that when crank 338 is rotated the carriers either move together or apart, depending upon the rotation of the crank 338. As can be seen in FIGS. 1B and 8, each of the carriers 323 mounts a pair of pneumatic staplers 342. Examples of prior art pneumatic staplers are found in U.S. Pat. Nos. RE26,262, 2,801,415, 2,682,052, 3,278,103, 3,760,695, 3,720,414 and 3,964,659. The staplers 342 are provided with pressurized air from means (not shown) and are operative when actuated to eject a stream of staples downward.

Operation of the stapling unit 300 is as follows: the crank 332 is rotated to move the carrier to the position wherein the staple emitting portions of the stapling guns 342 are aligned with the stud 28 at either end of the wall section being assembled. The crank 338 is then rotated as the stapling units are actuated. Accordingly, a stream of staples is provided in a line along the stud to secure the sheathing to the stud. Once one full length of the sheathing along the stud has been stapled the crank 332 is rotated in the appropriate direction to move the carrier 302 to the longitudinal position wherein the stapling heads are aligned with the next successive stud in the framework. The crank 338 is then rotated as the stapling guns are energized to produce a second line of staples in the sheathing panel and the underlying stud. Since the carriers 323 move in unison either toward or away from each other it is not necessary to reposition the carriers from the last stapling line traversal since the next stapling line traversal can be accomplished either from the middle of the work piece or from the ends depending upon the last position of the carriers after completing the previous staple line.

In accordance with a preferred aspect of the invention in order to ensure that the sheathing and framework disposed thereunder stay in position during the stapling operation each of the stapling carriers 323 includes a downwardly extending leg having a freely rotatable ball 346 in its free end. The ball is adapted to ride over the surface of the sheathing to hold the sheathing and underlying framework in place during the stapling operation.

Once the sheathing has been stapled in place the wall section is then in condition for the cutting of any doors, windows or any other openings therein, as required. To that end, as can be seen in FIG. 4, a cutting assembly, designated generally by the reference numeral 400, is disposed at the workstation 250.

The assembly 400 basically comprises a carriage in the form of a cross frame portion 402 and a pair of vertically extending side legs 404 connected to opposite ends of the cross frame 402. At the lower end of each of the side legs 404 there is a horizontally disposed support leg 406 (FIG. 2B). A pinion 408 is journalled for rotation at each end of each of the legs 406. Each of the pinions 408 is adapted to roll along the underlying rack 52. A third pinion 410 is provided in each of the legs 406 at the intermediate point thereof and aligned with the vertical side leg 404. The pinion 410 is connected to a shaft 412 extending through leg 406 and terminating at its free end in a sprocket 414.

A cross drive shaft 416 extends through the hollow interior of cross frame 402. Disposed at each end of the cross drive shaft 416 is a sprocket 418. A crank 420 is connected to the cross shaft 416 adjacent to one sprocket 418. A drive chain 422 is disposed about sprocket 418 and sprocket 414 on one side of carrier 402 and a similar chain 422 is disposed about the corresponding sprockets on the other side of the carrier. As will be appreciated from the foregoing, upon the rotation of crank 420 the carrier 402 is enabled to move either upstream or downstream in the second workstation, depending upon the direction of rotation of crank 420.

The carriage 402 supports a cutting head carrier 424. A conventional router unit 426 (FIG. 9) and a conventional circular saw 428 (FIG. 9) are mounted on the carrier 424. The carrier is adapted to be moved along the cross frame 402 to establish the transverse positioning of the cutting units with respect to the assembled wall section disposed therebelow. To that end, a positioning chain 430 is mounted between opposed upward extensions 432 of the side walls 404. Disposed within each extension 432 there is a sprocket 434 mounted on a shaft 436. The chain 430 extends about the opposed sprockets 434. The carrier 424 is connected to the chain 430 by a bracket 438.

Figure 7:
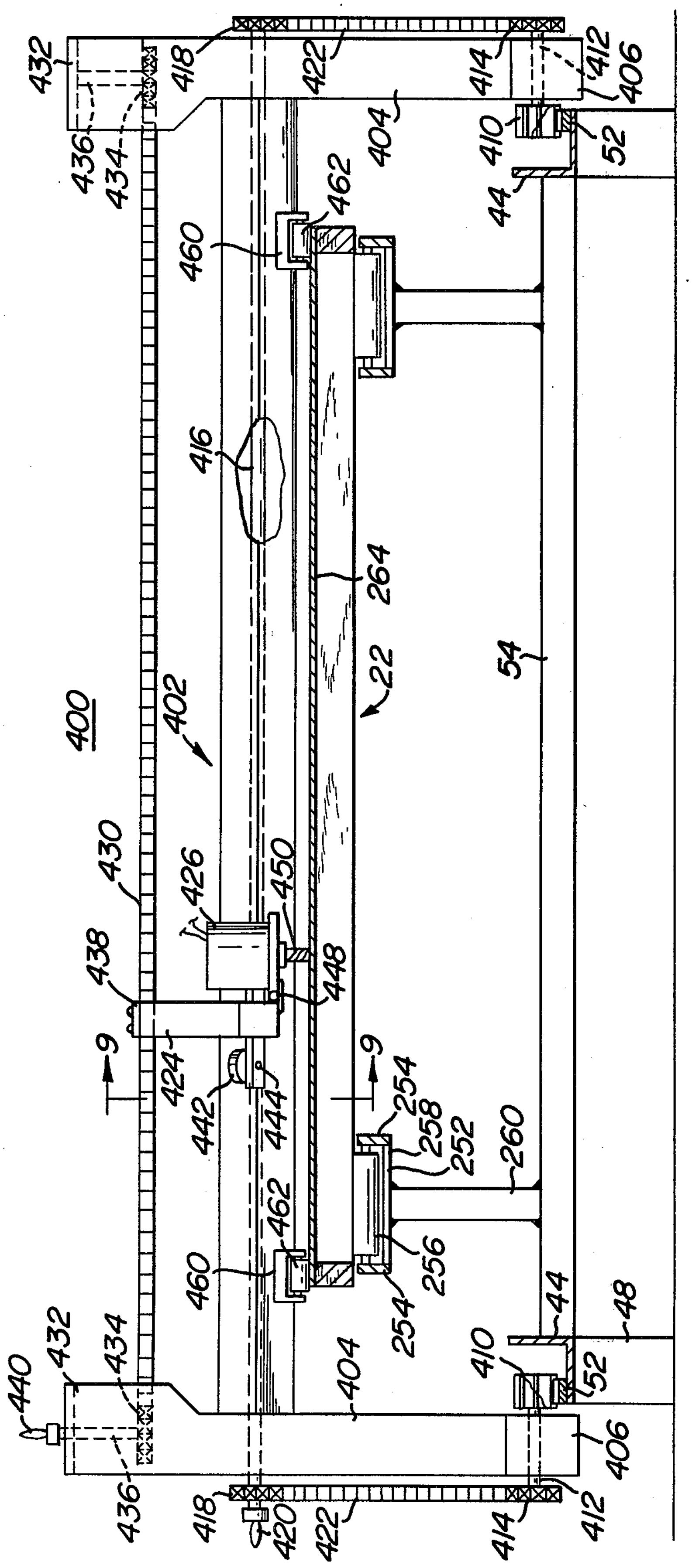
FIG. 7 is an enlarged sectional view taken along line 707 of FIG. 2B.

As can be seen in FIG. 7, one of the shafts 436 has mounted at the upper free end thereof a crank 440 which when rotated causes the circulation of chain 430, thereby moving the carrier 424 transversely across the assembled wall section 22.

Figure 9:
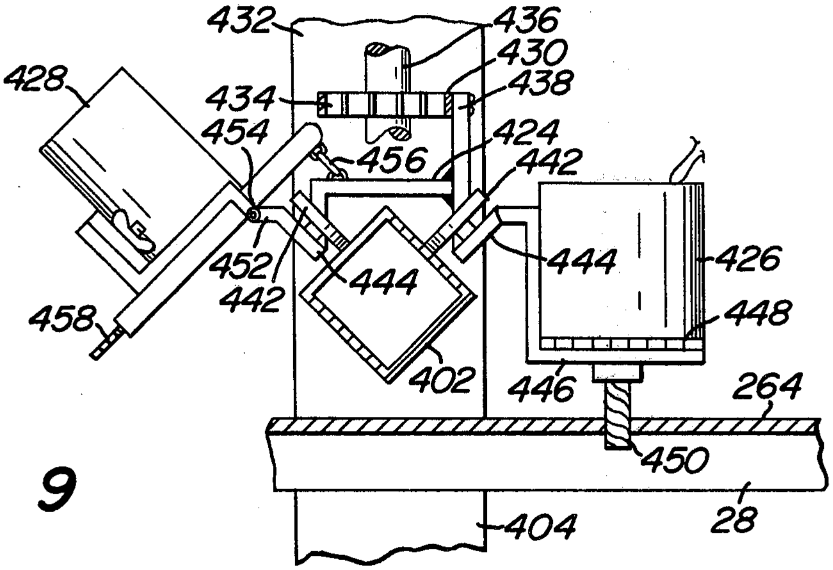
FIG. 9 is an enlarged sectional view taken along line 9—9 of FIG. 7.

In order to ensure that the carrier moves freely along the cross frame 402 a pair of rollers 442 are mounted on brackets 444 extending from the carrier 424 and are arranged to roll on respective surfaces of the cross frame (see FIG. 9).

In accordance with a preferred aspect of the invention the router 426 and the saw 428 are mounted on pivotable supports on the carrier 424 so that either may be retracted when the other is being utilized. To that end, as can be seen in FIG. 9, the router 426 is supported on the carrier 424, via a mounting bracket 446 connected to carrier 424. A hinge 448 is connected between the housing for the router and the bracket 446. The router is pivotable about hinge 448 so that it may be pivoted from a retracted position (not shown) to its operative position (shown in FIG. 9), wherein its cutter 450 extends downward. When the router has completed its operation it is pivoted about hinge 448 in the counterclockwise direction from a position shown in FIG. 7 to retract it fully from the work piece. The saw 428 is mounted, via a bracket 452 connected to the carrier 424. A hinge 454 is connected between the housing of the saw 428 and the bracket 452. A hook and eye combination 456 is provided to hold the saw in the retracted position shown in FIG. 9. When it is desired to use the saw to cut away portions of sheathing 264 the hook and eye 456 are disengaged and the saw is pivoted counterclockwise from the position shown in FIG. 9 so that its blade 458 extends vertically.

Although not shown in the drawing, means are provided on the carrier for enabling the saw to be disposed so that its blade 458 extends either longitudinally or transversely of the workstation 250.

As can be seen in FIG. 7, means are provided on the underside of cross piece 402 to hold down the wall assembly during the sawing or routing operation by the apparatus 400. The means comprises a pair of brackets 460 mounted on the underside of the cross frame 402 and having a cylindrical roller 462 journalled therein with its axis of rotation being transverse of the workstation.

If desired, clamping means (not shown) can be used to hold the assembled wall section in position with respect to the apparatus 400 during a cutting operation by assembly 400.

Operation of the cutting assembly 400 to cut away the sheathing 264 to form the doorway of the wall section shown in FIG. 4 is as follows: assuming that it is desired to commence the cutting operation at the bottom right corner of the door opening shown in FIG. 1B the crank 420 is rotated to move the carriage 402 to the proper longitudinal position at the workstation. The crank 440 is then rotated to bring the carrier with the router head thereon to the correct transverse position. The router head 426 is pivoted to the operative position shown in FIG. 7 and then it it turned on. While the router is on the crank 440 is rotated such that the cutter 450 commences cutting a transverse line through the sheathing 264. Once a sufficiently long cut has been made the router may be retraced and the saw 428 extended so that its blade is disposed in the cut made by the router. The saw is then turned on and the crank 440 rotated to move the saw along the full length of the transverse cut. At the end of the transverse cut the saw is retracted and the router extended to form the corner cut and start the longitudinal cut, that is the cut running flush with the inside edge of the cross stud 36. The router can be used to complete the longitudinal cut or alternatively can be retracted, and the saw extended and rotated 90° with respect to the carrier so that its blade extends longitudinally. The saw is then turned on and the crank 420 rotated to move the carriage downstream, thereby moving the saw longitudinally to complete the longitudinal cut of the doorway. Once the longitudinal cut has been completed, either by the use of the router or the saw, the router is extended, turned on and the crank 440 rotated to cause the router to begin the second transverse cut (the cut along the opposed side of the doorway). Once a sufficient length cut has been made the router is retracted, the saw extended, its blade oriented and then turned on. The crank 440 is then rotated to complete the transverse cut.

Once the doorway has been cut the finished wall section is manually slid downstream on the roller conveyor 250 and then the section is removed and ready for storage or shipment to the building site.

As should be appreciated from the foregoing, the system of the instant invention has wide utility since it enables the ready fabrication of various shaped and sized wall sections with minimal adjustments. That feature along with the relative simplicity of the system, renders it extremely useful for the construction industry.

Without further elaboration, the foregoing will so fully illustrate this invention that others may, by applying current or future knowledge, readily adapt the same for use under various conditions of service.

What is claimed as the invention is:

1. A system for fabricating a wall for a building, said wall being composed of a framework of plural studs disposed in a parallel array between a pair of opposed plates and sheathing disposed over said framework, said system comprising a first workstation for assembling said studs and plates into said framework, a second workstation for securing said sheathing to the assembled framework and first conveyor means for carrying the assembled framework from the first workstation to the second workstation, said first workstation comprising first means for positioning said studs thereon in a parallel array and second means for positioning each of said plates perpendicular to said studs and in contact with the ends thereof, automatically operating assembly means for assembling said studs and plates into said framework and comprising a carriage supporting securing means thereon and mounted for movement along said plates, said carriage moving along said plates and automatically operative at the location of each of said studs to secure the end of said stud to the abutting portion of the opposed plates, said first positioning means comprising a vertically retractable frame having locating pins thereon, said locating pins establishing the spacing between said studs, said first workstation including first cutting means disposed at an upstream portion thereof for removing excess length portions from said plates, said first and second positioning means being retractable to enable said first conveyor means to carry the assembled framework to said second workstation, said second workstation comprising assembling means adapted to secure sheathing disposed thereover in place.

2. A system for fabricating a wall for a building, said wall being composed of a framework of plural studs disposed in a parallel array between a pair of opposed plates and sheathing disposed over said framework, said system comprising a first workstation for assembling said studs and plates into said framework, a second workstation for securing said sheathing to the assembled framework and first conveyor means for carrying the assembled framework from the first workstation to the second workstation, said first workstation having an upstream end and comprising first means for positioning said studs thereon in a parallel array and second means for positioning each of said plates perpendicular to said studs and in contact with the ends thereof, automatically operating assembly means for assembling said studs and plates into said framework and comprising a carriage supporting securing means thereon and mounted for movement along said plates, said carriage moving along said plates and automatically operative at the location of each of said studs to secure the end of said studs to the abutting portion of the opposed plates, said first workstation including first cutting means disposed at the upstream end of said workstation, said first cutting means including a removable blade, a guide block having a notch extending in a transverse direction to said workstation, means for moving said blade down the slot and adjustable positioning means for moving said blade and said guide block to a position wherein said blade is immediately adjacent the most upstream stud of said framework for removing excess length portions from said plates, said first and second positioning means being retractable to enable said first conveyor means to carry the assembled framework to said second workstation, said second workstation comprising assembling means adapted to secure sheathing disposed thereover in place.

3. The system of claim 1 wherein said second positioning means comprises a fixed frame located outside said vertically retractable frame and including vertically retractable locating pins, said locating pins establishing the positioning of the plates with respect to said stud ends.

4. The system of claim 3 additionally comprising rack means extending along said first workstation, said carriage being mounted on said rack for movement therealong.

5. The system of claim 4 additionally comprising sensing means carried by said carriage for sensing when the securing means carried thereby is aligned with the stud to secure said stud to the abutting portion of the plate.

6. The system of claim 5 wherein said securing means comprises a pneumatic nailer.

7. The system of claim 6 wherein said first conveyor comprises a driven chain having at least one finger projecting therefrom, said chain being located along said workstation between the vertically retractable frame and the fixed frame and arranged such that when driven the finger contacts the upstream stud of the framework to push the framework down the fixed frame to said second workstation.

8. The system of claim 7 wherein said second workstation includes a second conveyor means for facilitating the positioning of said framework provided by said first conveyor means.

9. The system of claim 8 wherein the assembly means at said second workstation comprises a carriage supporting securing means thereon and mounted for movement along said plate.

10. The system of claim 9 wherein the securing means for the sheathing is movable along said carriage.

11. The system of claim 10 wherein said securing means for said sheathing comprises at least one pneumatic stapler.

12. The system of claim 11 wherein said second conveyor means is a non-driven, roller conveyor.

13. The system of claim 12 wherein the carriage for the stapler moves along said rack.

14. The system of claim 13 wherein said second workstation also includes cutting means located thereat.

15. The system of claim 14 wherein said cutting means is mounted on a carriage, said carriage being movable along said rack through said second workstation.

16. The system of claim 15 wherein said cutting means is movable along said carriage.

17. The system of claim 16 wherein said cutting means comprises a saw for cutting away portions of the sheathing.

18. The system of claim 17 wherein the cutting means also comprises a router for cutting away said sheathing.

* * * * *